US008482935B2

(12) United States Patent
Suntio et al.

(10) Patent No.: US 8,482,935 B2
(45) Date of Patent: Jul. 9, 2013

(54) TRANSFORMER-ISOLATED SWITCHING CONVERTER

(75) Inventors: Teuvo Suntio, Ylinen (FI); Juha Huusari, Tampere (FI)

(73) Assignee: ABB Oy, Helsinki (FI)

(\*) Notice: Subject to any disclaimer, the term of this patent is extended or adjusted under 35 U.S.C. 154(b) by 153 days.

(21) Appl. No.: 13/210,493

(22) Filed: Aug. 16, 2011

(65) Prior Publication Data

US 2012/0044717 A1    Feb. 23, 2012

(30) Foreign Application Priority Data

Aug. 18, 2010    (EP) .................................... 10173167

(51) Int. Cl.
*H02M 3/335*    (2006.01)

(52) U.S. Cl.
USPC ........................................... 363/17; 323/906

(58) Field of Classification Search
USPC ................... 363/15, 16, 17, 20, 21.01, 21.04, 363/98, 132
See application file for complete search history.

(56) References Cited

U.S. PATENT DOCUMENTS

| | | | | |
|---|---|---|---|---|
| 5,642,267 A | \* | 6/1997 | Brkovic et al. | 363/16 |
| 5,712,780 A | \* | 1/1998 | Youn et al. | 363/131 |
| 6,583,999 B1 | \* | 6/2003 | Spindler et al. | 363/98 |
| 6,661,684 B2 | \* | 12/2003 | Morita | 363/89 |
| 7,009,852 B2 | \* | 3/2006 | Ying et al. | 363/17 |
| 7,061,212 B2 | \* | 6/2006 | Phadke | 323/222 |
| 7,330,366 B2 | \* | 2/2008 | Lee et al. | 363/101 |
| 7,688,608 B2 | \* | 3/2010 | Oettinger et al. | 363/132 |

| | | | |
|---|---|---|---|
| 2005/0173615 A1 | | 8/2005 | Hontele |

FOREIGN PATENT DOCUMENTS

WO    WO 03/105327 A2    12/2003

OTHER PUBLICATIONS

European Search Report issued on Feb. 25, 2011, European Application No. 10173167.7.
J.A. Morales-Saldaña et al., Multiloop controller design for a quadratic boost converter, IET Electr. Power Appl., 2007, 1, (3), pp. 362-367.
J. Leppäaho et al, Solar-Generator-Interfacing with a Current-Fed Superbuck Converter Implemented by Duality-Transformation Methods, The 2010 International Power Electronics Conference, pp. 680-687.
Wei Song et al., Current-Fed Dual-Bridge DC-DC Converter, IEEE Transactions on Power Electronics, vol. 22, No. 2, Mar. 2007, pp. 461-469.
Wayne W. Weaver et al., Analysis and Applications of a Current-Sourced Buck Converter, Department of Electrical and Computer Engineering, University of Illinois at Champaign-Urbana, Urbana, Illinois USA, pp. 1664-1670, Mar. 1, 2007.
Robert W. Erickson et al., Fundamentals of Power Electronics, Second Edition, University of Colorado, Boulder, Colorado, pp. 165-168, Jan. 2001.

(Continued)

*Primary Examiner* — Timothy J Dole
*Assistant Examiner* — Alex Torres-Rivera
(74) *Attorney, Agent, or Firm* — Buchanan Ingersoll & Rooney PC

(57) ABSTRACT

Exemplary systems and methods provide a transformer-isolated current-fed quadratic full-bridge converter topology. The optimal interfacing of a current source, such as a solar panel, can be implemented by using current-fed converters. The current-fed converter can operate within the whole range of a UI curve from short-circuit to open-circuit condition and its input voltage can be readily controlled. The quadratic behaviour between input and output in regard of a duty cycle allows large conversion ratios.

16 Claims, 3 Drawing Sheets

OTHER PUBLICATIONS

Teuvo Suntio et al., Issued on Solar-Generator Interfacing with Voltage-Fed MPP-Tracking Converters, EPE Journal, vol. 20, No. 3, Sep. 2010, pp. 40-47.

Jari Leppäaho et al., Dynamic Properties of PCM-Controlled Current-Fed Boost Converter in Photovoltaic System Interfacing, Tampere University of Technology, pp., Sep. 1, 2011.

* cited by examiner

TRANSFORMER-ISOLATED SWITCHING CONVERTER

RELATED APPLICATION

This application claims priority under 35 U.S.C. §119 to European Patent Application No. 10173167.7 filed in Europe on Aug. 18, 2010, the entire content of which is hereby incorporated by reference in its entirety.

FIELD

The present invention relates to switching converters, such as converters interfacing solar generators.

BACKGROUND INFORMATION

New forms of power generation and storage have introduced a need for ways to interface with them. One interfacing method, such as solar power generation, converts solar power into a more useable form.

A solar panel can include an array of series/parallel-connected solar cells. The voltage produced by the solar panel can be too low to be used directly in an application for supplying electricity to the grid. On the other hand, the voltage can be too high to be fed directly to a battery or array of batteries. In addition, the power output of a solar panel can depend greatly on the lighting conditions. As a result, the output power of a solar panel can fluctuate rapidly.

Therefore, implementation of modular solar energy systems where solar panels or a group of panels are directly connected to a low voltage or a high voltage bus usually specifies the use of a maximum-power-point-tracking (MPPT) converter with a large conversion ratio. The converter converts the voltage produced by the solar panels into another voltage which is more suitable for the application. A conventional way to interface with solar panels is to use a voltage-fed switching converter.

A disadvantage associated with the above arrangement is due to its limited operational range. The application may have to operate under conditions specifying a greater operational range. The solar systems are also known to be sensitive to common mode currents, which can reduce the useful life of the solar cells and cause human safety issues when using conventional converters.

SUMMARY

An exemplary switching converter is disclosed. The switching converter comprising, a first input terminal and a second input terminal, both for connecting to a current source; a first output terminal and a second output terminal, that are both connected to a load; a transformer with a primary winding, a secondary winding and a galvanic isolation between the windings, wherein the primary winding and the secondary winding include two terminals; a primary side first capacitor connected between the first input terminal and the second input terminal; a primary side first inductor with two terminals, connected from its first terminal to the first input terminal; a primary side second inductor with two terminals; a primary side first rectifying device connected between the primary side first inductor second terminal and the primary side second inductor second terminal, thus allowing a flow of current from the primary side first inductor second terminal to the primary side second inductor second terminal; a primary side second rectifying device connected between the primary side first inductor second terminal and the primary side second inductor first terminal, thus allowing a flow of current from the primary side first inductor second terminal to the primary side second inductor first terminal; a primary side second capacitor connected between the second inductor first terminal and the second input terminal; a first switching device connected between the primary side second inductor second terminal and the transformer primary winding first terminal and adapted to be able to set the connection between the primary side second inductor second terminal and the transformer primary winding first terminal to a conducting and a non-conducting state; a second switching device connected between the primary side second inductor second terminal and the transformer primary winding second terminal and adapted to be able to set the connection between the primary side second inductor second terminal and the transformer primary winding second terminal to a conducting and a non-conducting state; a third switching device connected between the transformer primary winding first terminal and second input terminal and adapted to be able to set the connection between the transformer primary winding first terminal and the second input terminal to a conducting and a non-conducting state; a fourth switching device connected between the transformer primary winding second terminal and the second input terminal and adapted to be able to set the connection between the transformer primary winding second terminal and the second input terminal to a conducting and a non-conducting state; a secondary side rectifying means for rectifying a current of the transformer secondary winding; a secondary side filtering means for filtering a current between the rectifier means and a converter output; and means for controlling a voltage between the input terminals.

An exemplary switching converter is disclosed. The switching converter comprising: a first input terminal and a second input terminal, both for connecting to a current source; a first output terminal and a second output terminal, that are both connected to a load; a transformer with a primary winding, a secondary winding and a galvanic isolation between the windings, wherein each of the primary and secondary windings includes two terminals; a primary side first capacitor connected between the first input terminal and the second input terminal; a primary side first inductor connected to the first input terminal; a primary side second inductor; a primary side first rectifying device connected between a second terminal of the primary side first inductor and a second terminal of the primary side second inductor; a primary side second rectifying device connected between the second terminal of primary side first inductor and a first terminal of the primary side second inductor; a primary side second capacitor connected between a first terminal of the second inductor and the second input terminal; a first switching device connected between the second terminal of the primary side second inductor and a first terminal of the transformer primary winding; a second switching device connected between the second terminal of the primary side second inductor and a second terminal of the transformer primary winding; a third switching device connected between the first and second terminals of the transformer primary winding; a fourth switching device connected between the second terminal of the transformer primary winding and the second input terminal; a secondary side rectifying means for rectifying a current of the transformer secondary winding; and a secondary side filtering means for filtering a current between the rectifier means and a converter output.

BRIEF DESCRIPTION OF THE DRAWINGS

In the following, the invention will be described in greater detail by means of preferred embodiments with reference to the accompanying drawings, in which.

DETAILED DESCRIPTION

The exemplary embodiments of the present disclosure are directed to providing a method and an apparatus to overcome the above problems of known systems.

These embodiments are based on the idea of using a transformer-isolated current-fed quadratic full-bridge converter topology. The optimal interfacing of a current source, such as a solar panel, can be implemented by using current-fed converters.

A current-fed converter can, in principle, operate from short-circuit to open-circuit condition. Its input voltage can also be controlled. The quadratic behaviour allows conversion ratios which are larger than those with a conventional converter.

High-frequency transformer isolation can also be used to solve the problems associated with the common mode currents.

Figure 1:
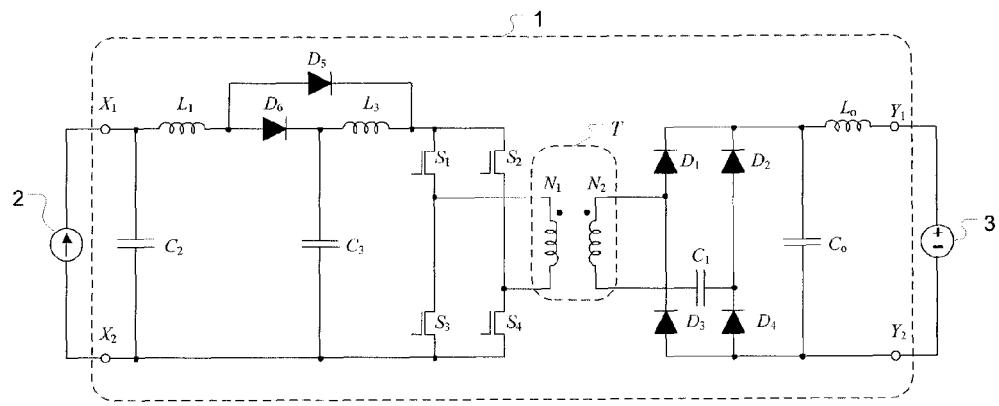
FIG. 1 illustrates a power stage of a switching converter in accordance with an exemplary embodiment.

FIG. 1 illustrates a power stage of a switching converter in accordance with an exemplary embodiment. The exemplary embodiment uses a transformer-isolated current-fed quadratic full-bridge converter topology.

A current-fed converter can, in principle, operate within the whole range of a UI curve of a current source from a short-circuit to an open-circuit condition, and its input voltage can be readily controlled. The quadratic behaviour between input and output in regard of a duty cycle can allow conversion ratios that are larger than those with a conventional converter.

The switching converter 1 includes a first input terminal $X_1$ and a second input terminal $X_2$, both of which are adapted to be connected to a current source 2. The current source 2 can be, for example, a solar panel or a group of solar panels. The current source can also be a Superconducting Magnetic Energy Storage (SMES).

The switching converter 1 also includes a first output terminal $Y_1$, and a second output terminal $Y_2$, both of which can be connected to a load 3. The load can be, for example, a high voltage or a low voltage DC bus.

The switching converter 1 can include a transformer T with a primary winding, a secondary winding, and a galvanic isolation between the windings, wherein the primary winding includes two terminals and the secondary winding includes two terminals. By modifying the turns ratio n between the windings of the transformer, different conversion ratios between the input and the output can be achieved. High-frequency transformer isolation can also solve the problems associated with the common mode currents.

A primary side first capacitor $C_2$ can be connected between the first input terminal $X_1$ and the second input terminal $X_2$. A primary side first inductor $L_1$ with two terminals is connected from its first terminal to the first input terminal $X_1$. Together the first capacitor $C_2$ and the first inductor $L_1$ form an input EMI filter.

The switching converter 1 can also include a primary side second inductor $L_3$ with two terminals. A primary side first rectifying device $D_5$ is connected between the primary side first inductor $L_1$ second terminal and the primary side second inductor $L_3$ second terminal, thus allowing a flow of current from the primary side first inductor $L_1$ second terminal to the primary side second inductor $L_3$ second terminal. The primary side first and second rectifying device can be, for example, diodes or any other suitable rectifying as desired.

A primary side second rectifying device $D_6$ is connected between the primary side first inductor $L_1$ second terminal and the primary side second inductor $L_3$ first terminal, thus allowing a flow of current from the primary side first inductor $L_1$ second terminal to the primary side second inductor $L_3$ first terminal.

A primary side second capacitor $C_3$ is connected between the second inductor $L_3$ first terminal and the second input terminal $X_2$.

The converter 1 can also include four switching devices $S_1$, $S_2$, $S_3$, and $S_4$, which form a full bridge. The switching can be, for example, power MOSFETs or IGBTs or any other suitable switching device as desired. The first switching device $S_1$ is connected between the primary side second inductor $L_3$ second terminal and the transformer T primary winding first terminal, and can set the connection between the primary side second inductor $L_3$ second terminal and the transformer T primary winding first terminal to a conducting and a non-conducting state.

In a similar manner, the second switching device $S_2$ is connected between the primary side second inductor $L_3$ second terminal and the transformer T primary winding second terminal, and can set the connection between the primary side second inductor $L_3$ second terminal and the transformer T primary winding second terminal to a conducting and a non-conducting state.

The third switching device $S_3$ is connected between the transformer T primary winding first terminal and the second input terminal $X_2$ and can set the connection between the transformer T primary winding first terminal and the second input terminal $X_2$ to a conducting and a non-conducting state.

The fourth switching device $S_4$ is connected between the transformer T primary winding second terminal and the second input terminal $X_2$ and can set the connection between the transformer T primary winding second terminal and second input terminal $X_2$ to a conducting and a non-conducting state.

The transformer T secondary winding side includes a secondary side rectifying means for rectifying the current of the transformer T secondary winding, and a secondary side filtering means for filtering the rectified current.

The transformer T has two secondary winding terminals. In another exemplary embodiment, other secondary windings, for example, a secondary winding with a center tap, can also be used.

As shown in FIG. 1, a secondary side first inductor $L_o$ with two terminals is connected from its second terminal to the first output terminal $Y_1$. A secondary side first capacitor $C_o$ is connected between the secondary side first inductor $L_o$ first terminal and the second output terminal $Y_2$. Together the secondary side first inductor $L_o$ and the secondary side first capacitor $C_o$ form an EMI filter in the output. Other filter topologies can be used in a converter in accordance with various other exemplary embodiments of the present disclosure.

The topology of the rectifier means depends on the type of the transformer T secondary winding. The converter 1 can also include four secondary side rectifying devices $D_1$, $D_2$, $D_3$, and $D_4$ as the rectifying means. The rectifying devices form a rectifying bridge, which rectifies the current from the transformer T. In FIG. 1, the rectifying devices are illustrated as diodes, and can be implemented as any other suitable rectifying device as desired.

The secondary side first rectifying device $D_1$ is connected between the transformer T secondary winding first terminal and the secondary side first inductor $L_o$ first terminal, thus allowing a flow of current from the transformer T secondary winding first terminal to the secondary side first inductor $L_o$ first terminal.

The secondary side second rectifying device $D_2$ is connected between the transformer T secondary winding second terminal and the secondary side first inductor $L_o$ first terminal, thus allowing a flow of current from the transformer T secondary winding second terminal to the secondary side first inductor $L_o$ first terminal.

The secondary side third rectifying device $D_3$ is connected between the second output terminal $Y_2$ and the transformer T secondary winding first terminal, thus allowing a flow of current from the second output terminal $Y_2$ to the transformer T secondary winding first terminal.

The secondary side fourth rectifying device $D_4$ is connected between the second output terminal $Y_2$ and the transformer T secondary winding second terminal, thus allowing a flow of current from the second output terminal $Y_2$ to the transformer T secondary winding second terminal.

The connection between the transformer T secondary winding second terminal and the secondary side second and fourth rectifying device $D_2$ and $D_4$ can also include a secondary side second capacitor $C_1$. The secondary side second capacitor $C_1$ can be connected from its first terminal to the transformer T secondary winding second terminal, which provides voltage balancing for the transformer T.

The converter 1 also includes means for controlling the voltage between the input terminals.

Figure 2:
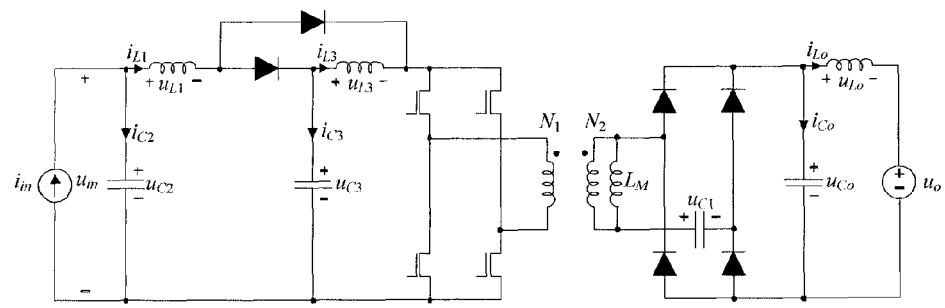
FIG. 2 illustrates polarities of relevant currents and voltages of a power stage of a switching converter in accordance with an exemplary embodiment.

FIG. 2 illustrates polarities of relevant currents and voltages of a power stage of a switching converter in accordance with an exemplary embodiment. As shown in FIG. 2, the transformer T is represented in FIG. 2, and as later discussed in FIGS. 3, 4, and 5, by an ideal transformer with a magnetizing inductor $L_M$ between the terminals of the ideal transformer secondary winding.

The exemplary converters according to the present disclosure can have three operational states: a first on-time state, an off-time state, and a second on-time state.

Figure 3:
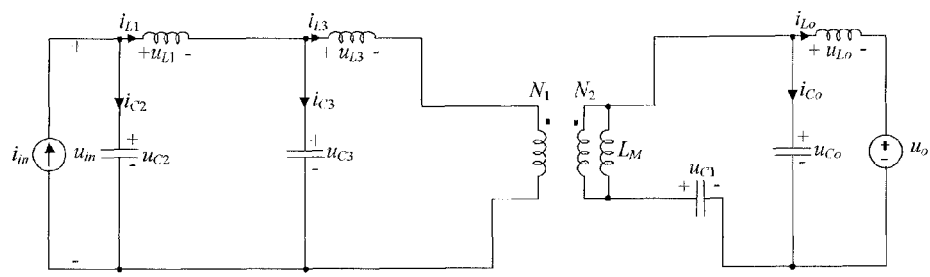
FIG. 3 illustrates a first on-time state circuit structure of a switching converter in accordance with an exemplary embodiment.

FIG. 3 illustrates a first on-time state circuit structure of a switching converter in accordance with an exemplary embodiment. As shown in FIG. 3, during the on-time 1, the controlled switching devices $S_2$, $S_3$ and the rectifying devices $D_2$, $D_3$, and $D_5$ are non-conducting and the switching devices $S_1$, $S_4$ as well as the rectifying devices $D_1$, $D_4$ and $D_6$ are conducting, resulting in a first on-time state circuit structure.

Figure 4:
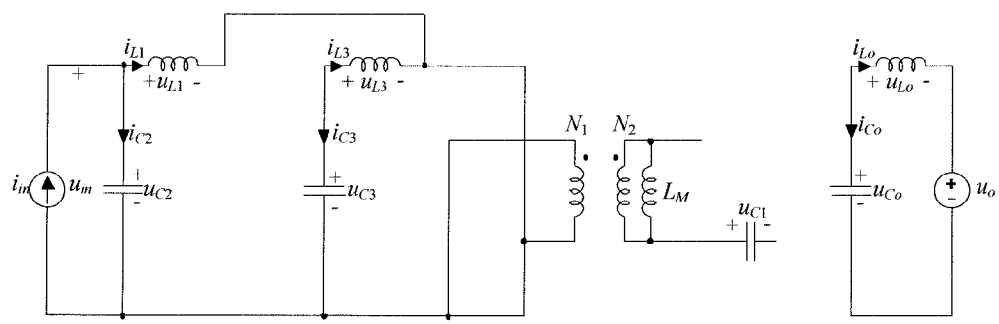
FIG. 4 illustrates an off-time state circuit structure of a switching converter in accordance with an exemplary embodiment.

FIG. 4 illustrates an off-time state circuit structure of a switching converter in accordance with an exemplary embodiment. As shown in FIG. 4, during the off-time state, all of the controlled switching devices and the rectifying device $D_5$ are conducting while the rest of the rectifying devices are off, resulting in an off-time circuit structure.

Figure 5:
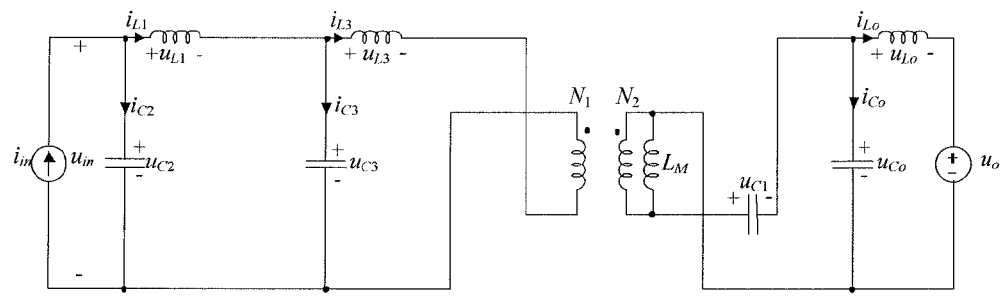
FIG. 5 illustrates a second on-time state circuit structure of a switching converter in accordance with an exemplary embodiment.

FIG. 5 illustrates a second on-time state circuit structure of a switching converter in accordance with an exemplary embodiment. As shown in FIG. 5, the off-time state is followed by the second on-time state during which the circuit structure is otherwise identical to that shown in FIG. 3 except that the other switching device pair $S_1$, $S_4$ is conducting. A complete operation cycle comprises (e.g., consists of) two off-time state cycles and of one first on-time state and one second on-time 2 state cycle.

The secondary side second capacitor $C_1$ provides Vs-balance of a transformer magnetizing inductor $L_M$. Assuming that the average DC voltage of the secondary side second capacitor $C_1$ is negligible, the converter has two sub-circuits, since the on-time state sub-circuits are identical. Hence, by applying Kirchhoff's laws, the following can be calculated for the on-time states:

$$u_{L1} = u_{C2} - u_{C3}$$

$$u_{L3} = u_{C3} - nu_{Co}$$

$$u_{Lo} = u_{C3} - u_o$$

$$i_{C2} = i_{in} - i_{L1}$$

$$i_{C3} = i_{L1} - i_{L3}$$

$$i_{Co} = ni_{L3} - i_{Lo}$$

$$u_{in} = u_{C2}$$

$$i_o = i_{Lo}, \quad (1)$$

where the main transformer turns ratio n is defined as $$n = \frac{N_1}{N_2}. \quad (2)$$

Similarly, the following can be calculated for the off-time state:

$$u_{L1} = u_{C2}$$

$$u_{L3} = u_{C3}$$

$$u_{Lo} = u_{C3} - u_o$$

$$i_{C2} = i_{in} - i_{L1}$$

$$i_{C3} = -i_{L3}$$

$$i_{Co} = -i_{Lo}$$

$$u_{in} = u_{C1}$$

$$i_o = i_{Lo}. \quad (3)$$

According to (1) and (3), average voltages across the inductors, average currents through the capacitors as well as an average output current and an average input voltage become as $$\langle u_{L1} \rangle = \langle u_{C2} \rangle - d \langle u_{C3} \rangle$$

$$\langle u_{L3} \rangle = \langle u_{C3} \rangle - dn \langle u_{Co} \rangle$$

$$\langle u_{L3} \rangle = \langle u_{C3} \rangle - \langle u_o \rangle$$

$$\langle i_{C2} \rangle = \langle i_{in} \rangle - \langle i_{L1} \rangle$$

$$\langle i_{C3} \rangle = d \langle i_{L1} \rangle - \langle i_{L2} \rangle$$

$$\langle i_{Co} \rangle = dn \langle i_{L3} \rangle - \langle i_{Lo} \rangle$$

$$\langle u_{in}\rangle = \langle u_{C2}\rangle$$

$$\langle i_o\rangle = \langle i_{Lo}\rangle. \quad (4)$$

where angle brackets $\langle\ \rangle$ denote an average over time and d denotes a duty ratio.

In order to maintain flux linkage and charge balances, the average voltages across the inductors and the average currents through the capacitors should equal zero. According to these principles, operating-point-related steady-state variables are given as $$U_{C2} = nD^2 U_o$$

$$U_{C3} = nDU_o$$

$$U_{Co} = U_o$$

$$I_{L1} = I_{in}$$

$$I_{L3} = DI_{in}$$

$$I_{Lo} = nD^2 I_{in}$$

$$I_o = nD^2 I_{in}$$

$$U_{in} = nD^2 U_o, \quad (5)$$

which indicate that the input-to-output and output-to-input relations are functions of the quadratic duty ratio $D^2$ as well as the transformer turns ratio n. The switching frequency of the converter is assumed to be $f_s$ and consequently, the switching period $T = 1/f_s$. The duty cycle $D = T_{on}/T_s$ and therefore, the length of on-time $T_{on} = DT_s$ and the length of off-time $T_{off} = (1-D)T_s$ because $T_s = T_{on} + T_{off}$. An operational cycle has two switching cycles, since it takes two complete switching cycles to obtain magnetizing flux balance. A switching cycle includes an off-time state cycle and an on-time state cycle. The on-time state cycle is either a first or a second on-time state cycle.

Figure 6:
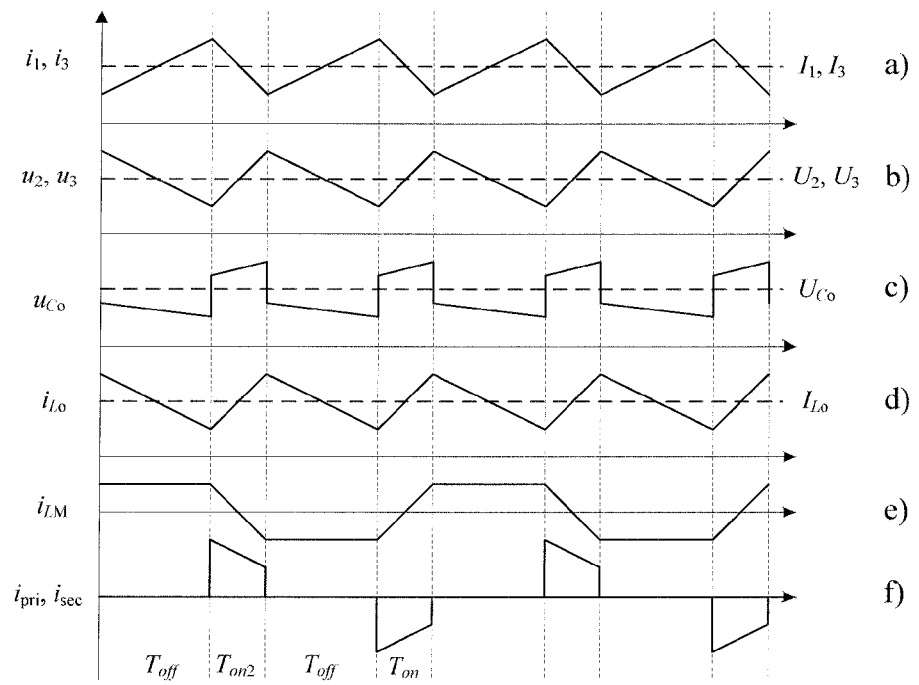
FIG. 6 illustrates approximate waveforms of capacitor voltages and inductor currents in accordance with an exemplary embodiment.

FIG. 6 illustrates approximate waveforms of capacitor voltages and inductor currents in accordance with an exemplary embodiment. FIG. 6 shows approximate waveforms of capacitor voltages and inductor currents. Average voltages $U_x$ and currents $I_x$ are represented by dashed lines, and instantaneous voltages $u_x$ and currents $i_x$ are represented by solid lines. The vertical dashed lines divide the waveforms into repeating operation cycle sections $T_{off}$, $T_{on}$, and $T_{on2}$, which represent the off-time state cycle and the first and second on-time state cycles, respectively. The approximate waveform of the currents of the inductors $L_1$ and $L_3$ is shown as a curve (a) where the on-time and off-time state slopes can be given as $$m_{L1,ON} = -nD(D-1)U_o/L_1$$

$$m_{L1,OFF} = -nD^2 U_o/L_1$$

$$m_{L3,ON} = -n(D-1)U_o/L_3$$

$$m_{L3,OFF} = -nDU_o/L_3. \quad (6)$$

The corresponding peak-to-peak ripple currents can be given as $$\Delta i_{L1\text{-}pp} = m_{L1,ON} DT_s,$$

$$\Delta i_{L3\text{-}pp} = m_{L3,ON} DT_s. \quad (7)$$

The corresponding average currents $I_{L1}$ and $I_{L3}$ are defined in (5). The selection of the inductors $L_1$, $L_3$ can be carried out based on the defined ripple and average currents.

The approximate waveforms of the capacitor voltages $u_{C2}$ and $u_{C3}$ are shown in FIG. 6 as a curve (b) exhibiting a triangle shape. The on-time and off-time state slopes can be given for the capacitor $C_2$ as $$m_{C2,ON} = (1-D)I_{in}/C_2,$$

$$m_{C2,OFF} = -DI_{in}/C_2 \quad (8)$$

as well as for the capacitor $C_3$ as $$m_{C3,ON} = DI_{in}/C_3,$$

$$m_{C3,OFF} = -DI_{in}/C_3. \quad (9)$$

According to the defined slopes (9), the peak-to-peak ripples associated with the capacitors can be determined by $$\Delta u_{Ci\text{-}pp} = m_{Ci,ON} DT_s. \quad (10)$$

The average voltages $U_{Ci}$ are defined in (5). The selection of the capacitors can be carried out according to the defined peak-to-peak ripple and average voltages.

The approximate waveform of the capacitor $C_o$ voltage $u_{Co}$ is shown in FIG. 6 as a curve (c). The on-time and off-time state slopes can be given for the capacitor $C_o$ as $$m_{Co,ON} = nD(1-D)I_{in}/C_o,$$

$$m_{Co,OFF} = D^2 I_{in}/C_o. \quad (11)$$

According to the defined slope in (11), the peak-to-peak ripple associated with the capacitor $C_o$ can be determined by $$\Delta u_{Co\text{-}pp} = m_{Co,ON} DT_s. \quad (12)$$

The average voltage $U_{Co}$ is defined in (5). The selection of the capacitor can be carried out according to the defined peak-to-peak ripple and average voltage.

In FIG. 6, the approximate waveform of the current of inductor $L_o$ is a curve (d) based on the voltage appearing across it which is the ripple voltage of the capacitor $C_o$ specified previously. The corresponding average current $I_{Lo}$ is defined in (5). The ripple current of the inductor $L_o$ is small and can be usually neglected when sizing the inductor. The peak-to-peak ripple current can be given by $$\Delta i_{Lo\text{-}pp} = m_{Co,ON} DT_s^2/(8L_o) \quad (13)$$

based on the change in the flux linkage of the inductor. The selection of the inductor can be based on the ripple and average currents.

As shown in FIG. 6, the approximate waveform of the main transformer magnetizing inductor $L_M$ current $i_{LM}$ is a curve (e) having a distinctive shape. Since the magnetizing inductor is placed on the secondary side of the transformer T, the rising and falling slopes of the current during the on-time states can be defined as $$m_{LM,UP} = U_o/L_M,$$

$$m_{LM,DOWN} = -U_o/L_M \quad (14)$$

whereas during the off-time state the current slope is zero. Therefore, the peak-to-peak magnetizing current can be defined as $$\Delta i_{LM\text{-}pp} = m_{LM,UP} DT_s. \quad (15)$$

The magnetizing current $i_{LM}$ adds to the transformer winding currents $i_{pri}$ and $i_{sec}$, which are shown in FIG. 6 as a curve (f).

The input voltage of the converter is pulsating and therefore, an EMI filter can be used for producing the average voltage ($\approx nD^2 U_o$) at its input. The capacitor $C_2$ and the inductor $L_1$ effectively form this kind of filter and no additional filter should be specified. Moreover, the primary side rectifying devices $D_5$, $D_6$ can be replaced with controlled switches in order to minimize conduction losses.

Figure 7:
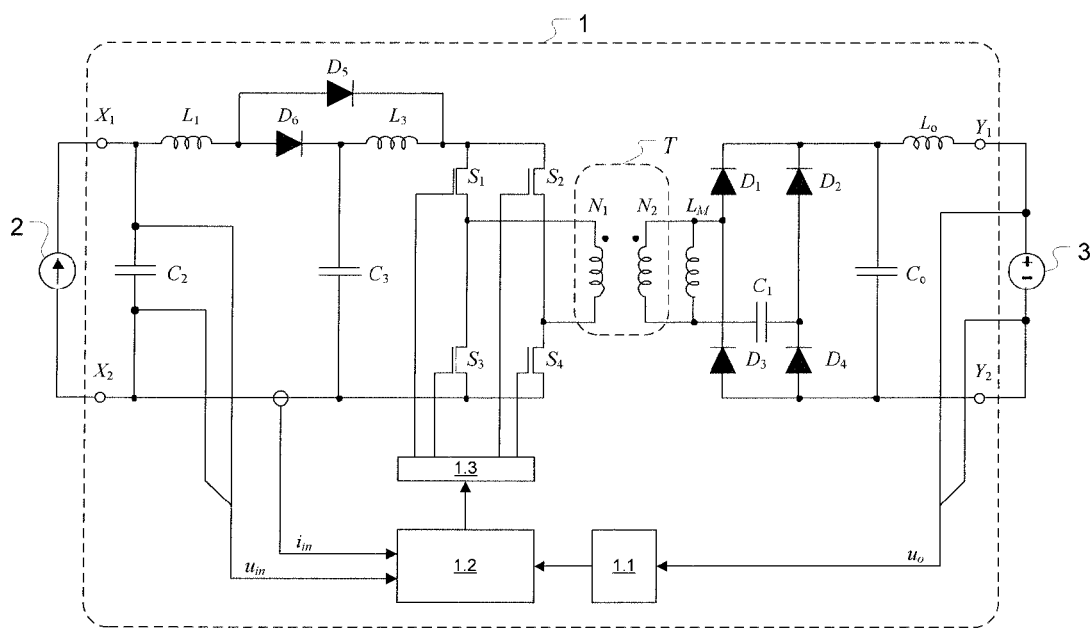
FIG. 7 illustrates a converter and solar generator arrangement in accordance with an exemplary embodiment.

FIG. 7 illustrates a converter and solar generator arrangement in accordance with an exemplary embodiment of the present invention. As shown in FIG. 7, the inputs of the converter are connected to a solar generator 2. Owing to the constant-current nature of the solar generator, the current-fed converter of the present invention is highly suitable for interfacing with the generator. A high voltage DC bus 3 acts as a load. In FIG. 7, all rectifying devices can be diodes and all switching devices can be power MOSFETs or other suitable rectifying devices as desired.

As stated in (5), a transformer-isolated current-fed quadratic full-bridge converter as illustrated in FIG. 7 has such steady-state conversion ratios that the steady-state input current $I_{in}$ is reflected to the steady-state output current $I_o$ multiplied by the turns ratio $n=N_1/N_2$ and the square of the duty ratio D as follows:

$$I_o = \frac{N_1}{N_2} D^2 I_{in}. \tag{16}$$

The output voltage $U_o$ is reflected to the input $U_{in}$ with the same conversion ratio:

$$U_{in} = \frac{N_1}{N_2} D^2 U_o. \tag{17}$$

By selecting properly the turns ratio $n=N_1/N_2$, a high overall conversion ratio as well as controlling range can be obtained.

The inductor $L_1$ and the capacitor $C_2$ form an input-side EMI filter, which produces the average of the input voltage reflected from the output voltage.

The converter 1 includes means for measuring the input voltage $u_{in}$, means for measuring the input current $i_{in}$, means 1.1 for measuring the output voltage $u_o$, and a control means 1.2. The means 1.1 for measuring the output voltage $u_o$ can also provide a galvanic isolation between the output voltage and the controller 1.2. The converter includes means 1.3 for controlling the switching devices.

The control means 1.2 outputs a control signal, and a value of the control signal is determined based on the measured voltages and currents. Means 1.3 for controlling the switching devices then control the switching devices based on the control signal.

The control means 1.2 are arranged such that the input voltage $u_{in}$ is kept at a level corresponding to maximum power by a feedback controller and a maximum power tracker.

The maximum power tracker may, for instance, determine the maximum power point based on the measured input current $i_{in}$. As a result, the tracker can determine a reference for the input voltage $u_{in}$. The feedback controller adjusts the input voltage $u_{in}$ to correspond to the voltage reference.

If the output voltage $u_o$ exceeds a predetermined level, an output-voltage feedback loop using the means 1.2 automatically reduces the output current to keep the output voltage $u_o$ constant.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A switching converter comprising:
 a first input terminal and a second input terminal, both for connecting to a current source;
 a first output terminal and a second output terminal, that are both connected to a load;
 a transformer with a primary winding, a secondary winding and a galvanic isolation between the windings, wherein the primary winding and the secondary winding include two terminals;
 a primary side first capacitor connected between the first input terminal and the second input terminal;
 a primary side first inductor with two terminals, connected from its first terminal to the first input terminal;
 a primary side second inductor with two terminals;
 a primary side first rectifying device connected between the primary side first inductor second terminal and the primary side second inductor second terminal, thus allowing a flow of current from the primary side first inductor second terminal to the primary side second inductor second terminal;
 a primary side second rectifying device connected between the primary side first inductor second terminal and the primary side second inductor first terminal, thus allowing a flow of current from the primary side first inductor second terminal to the primary side second inductor first terminal;
 a primary side second capacitor connected between the second inductor first terminal and the second input terminal;
 a first switching device connected between the primary side second inductor second terminal and the transformer primary winding first terminal and adapted to be able to set the connection between the primary side second inductor second terminal and the transformer primary winding first terminal to a conducting and a non-conducting state;
 a second switching device connected between the primary side second inductor second terminal and the transformer primary winding second terminal and adapted to be able to set the connection between the primary side second inductor second terminal and the transformer primary winding second terminal to a conducting and a non-conducting state;
 a third switching device connected between the transformer primary winding first terminal and second input terminal and adapted to be able to set the connection between the transformer primary winding first terminal and the second input terminal to a conducting and a non-conducting state;
 a fourth switching device connected between the transformer primary winding second terminal and the second input terminal and adapted to be able to set the connection between the transformer primary winding second terminal and the second input terminal to a conducting and a non-conducting state;
 a secondary side rectifying means for rectifying a current of the transformer secondary winding;
 a secondary side filtering means for filtering a current between the rectifier means and a converter output; and
 means for controlling a voltage between the input terminals.

2. The switching converter according to claim 1, wherein the secondary side filtering means comprises:

a secondary side first inductor with two terminals, connected from its second terminal to the first output terminal;

a secondary side first capacitor connected between the secondary side first inductor first terminal and the second output terminal, and in that the secondary side rectifying means comprises:

a secondary side first rectifying device connected between the transformer secondary winding first terminal and the secondary side first inductor first terminal, thus allowing a flow of current from the transformer secondary winding first terminal to the secondary side first inductor first terminal;

a secondary side second rectifying device connected between the transformer secondary winding second terminal and the secondary side first inductor first terminal, thus allowing a flow of current from the transformer secondary winding second terminal to the secondary side first inductor first terminal;

a secondary side third rectifying device connected between the second output terminal and the transformer secondary winding first terminal, thus allowing a flow of current from the second output terminal to the transformer secondary winding first terminal; and a secondary side fourth rectifying device connected between the second output terminal and the transformer secondary winding second terminal, thus allowing a flow of current from the second output terminal to the transformer secondary winding second terminal.

3. The switching converter according to claim 2, wherein the connection between the transformer secondary winding second terminal and the secondary side second and fourth rectifying device comprises a secondary side second capacitor.

4. The switching converter according to claim 1, wherein the current source is a solar generator.

5. The switching converter according to claim 1, wherein the load is essentially a DC bus.

6. The switching converter as claimed in claim 1, wherein the means for controlling the voltage between the input terminals comprises:

means for measuring an input voltage;
means for measuring an input current;
means for measuring an output voltage;
control means for determining a value of a control signal on the basis of the measured voltages and currents; and
means for controlling the switching devices on the basis of the control signal.

7. A method for controlling a voltage between input terminals of a switching converter as claimed in claim 1, the method comprising:

measuring an input voltage;
measuring an input current;
measuring a output voltage;
determining a value of a control signal on the basis of the measured voltages and currents; and
controlling the switching devices on the basis of the control signal.

8. The method according to claim 7, wherein the method comprises:

determining a maximum power point;
keeping the input voltage at a level corresponding to the maximum power point and, if the output voltage exceeds a predetermined level; and
reducing an output current to keep the output voltage constant.

9. A switching converter comprising:
a first input terminal and a second input terminal, both for connecting to a current source;
a first output terminal and a second output terminal, that are both connected to a load;
a transformer with a primary winding, a secondary winding and a galvanic isolation between the windings, wherein each of the primary and secondary windings includes two terminals;
a primary side first capacitor connected between the first input terminal and the second input terminal;
a primary side first inductor connected to the first input terminal;
a primary side second inductor;
a primary side first rectifying device connected between a second terminal of the primary side first inductor and a second terminal of the primary side second inductor;
a primary side second rectifying device connected between the second terminal of primary side first inductor and a first terminal of the primary side second inductor;
a primary side second capacitor connected between a first terminal of the second inductor and the second input terminal;
a first switching device connected between the second terminal of the primary side second inductor and a first terminal of the transformer primary winding;
a second switching device connected between the second terminal of the primary side second inductor and a second terminal of the transformer primary winding;
a third switching device connected between the first and second terminals of the transformer primary winding;
a fourth switching device connected between the second terminal of the transformer primary winding and the second input terminal;
a secondary side rectifying means for rectifying a current of the transformer secondary winding; and
a secondary side filtering means for filtering a current between the rectifier means and a converter output.

10. The switching converter of claim 9, wherein primary side rectifying device allows a flow of current from the second terminal of the primary side first inductor to the second terminal of the primary side second inductor.

11. The switching converter of claim 9, wherein the primary side second rectifying device allows a flow of current from the second terminal of the primary side first inductor to the first terminal of the primary side second inductor.

12. The switching converter of claim 9, wherein first switching device is connected to set a connection between the second terminal of the primary side second inductor and the first terminal of the transformer primary winding to a conducting and a non-conducting state.

13. The switching converter of claim 9, wherein the second switching device is connected to set a connection between the second terminal of the primary side second inductor and the second terminal of the transformer primary winding to a conducting and a non-conducting state.

14. The switching converter of claim 9, wherein the third switching device is connected to set the connection between the first terminal of the transformer primary winding and the second input terminal to a conducting and a non-conducting state.

15. The switching converter of claim 9, wherein the fourth switching device is connected to set the connection between the second terminal of the transformer primary winding and the second input terminal to a conducting and a non-conducting state.

16. The switching converter of claim 9, comprising:
means for controlling a voltage between the input terminals.

* * * * *